United States Patent Office 3,379,682
Patented Apr. 23, 1968

3,379,682
POLYMER STABILIZATION
John H. Prichard, Millington, N.J., assignor to Celanese Corporation, New York, N.Y., a corporation of Delaware
No Drawing. Continuation of application Ser. No. 287,764, June 14, 1963. This application Feb. 15, 1967, Ser. No. 616,198
10 Claims. (Cl. 260—45.85)

ABSTRACT OF THE DISCLOSURE

The present invention relates to oxymethylene polymers which have been improved as to light stability by incorporation into said polymers a stabilizing amount of at least one hydroxyphenyl ester of benzoic acid such as resorcinol monobenzoate.

---

The present application is a continuation of application Ser. No. 287,764, filed June 14, 1963, now abandoned, which is a continuation-in-part of application Ser. No. 3,257, filed Jan. 19, 1960, now abandoned, both applications being assigned to the same assignee as the present invention.

Background of the invention

This invention relates to oxymethylene polymers and particularly to a method for improving the light stability of polymers.

Oxymethylene polymers, having recurring —$CH_2O$— units have been known for many years. They may be prepared by polymerizing a source of oxymethylene units such as anhydrous formaldehyde or trioxane, a cyclic trimer of formaldehyde.

High molecular weight solid polyoxymethylenes have been prepared by polymerizing trioxane in the presence of certain cationic catalysts and may also be prepared in high yields and at rapid reaction rates by the use of catalysts comprising boron fluoride coordination complexes with organic compounds, as described in Patent No. 2,989,506 of Donald E. Hudgin and Frank M. Berardinelli. Boron fluoride gas is also a rapid and effective catalyst, as disclosed in Patent No. 2,989,507 of Hudgin and Berardinelli. Other catalysts are disclosed in the article by Kern et al. in Angewandte Chemie 73(6) pages 176–186 (Mar. 21, 1961).

Oxymethylene polymers of improved thermal stability may be prepared by introducing into the polymer chains, or attaching to the ends of the polymer chains, structures which are resistant to thermal detachment. The polymers may incorporate interspersed oxyalkylene units with adjacent carbon atoms, preferably oxyethylene units, as disclosed in Patent No. 3,027,352 of Walling, Brown and Bartz. Copolymers of this type may be described as having at least one chain containing oxymethylene (—$OCH_2$—) units (usually at least 85 mol percent) interspersed with (—O—R—) units wherein R is a divalent radical containing at least two carbon atoms directly linked to each other and positioned in the chain between the two valences, with any substituent in the R radical being inert.

Specific interspersed monomeric units which may be incorporated are those derived from lactones, carbonates, cyclic acid anhydrides or ethylenically unsaturated compounds such as styrene, divinyl ether, vinyl acetate, vinyl methyl ketone or acrolein as disclosed in the article by Kern et al. in Angewandte Chemie 73(6) pages 177–186 (Mar. 21, 1961). The polymers may be end-capped by acylation or etherification after polymerization or during polymerization by the use of selected chain transfer agents.

As used in the specification and claims, the term "oxymethylene polymers" denotes homopolymers and copolymers (including terpolymers, etc.) having at least 60 percent recurring oxymethylene (—$CH_2O$—) units, and further includes substituted homopolymers and copolymers wherein the substituents are inert i.e. do not participate in undesirable side reactions.

Oxymethylene polymers prepared by some methods are quite stable against thermal degradation and from which molded articles of excellent physical characteristics may be produced. However, where the molded articles are exposed to sunlight for extended periods they have a tendency to undergo embrittlement and surface encrustation.

Summary of the invention

In accordance with the present invention the light stability of oxymethylene polymers is enhanced by the incorporation therein of at least one hydroxyphenyl ester of benzoic acid having the formula:

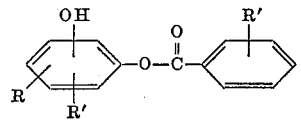

wherein:

R is selected from the group consisting of hydrogen and hydroxy radicals, and
R' is selected from the group consisting of hydrogen, halogen, and alkyls having from 1 to 4 carbon atoms.

Description of the preferred embodiment

The light stabilizing compounds include benzoic acid esters, halo benzoic acid esters and alkyl benzoic acid esters of such polyhydroxy phenols, as for example,

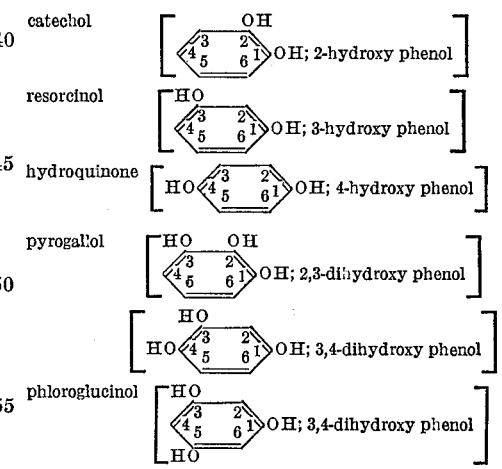

etc. and the halo and alkyl derivatives of said phenols, such as 2-hydroxy-4-methyl phenol; 2-hydroxy-5-tertiary butyl phenol; 2-hydroxy-4-chlorophenol; 2-hydroxy-5-bromophenol; 3-hydroxy-5-ethyl phenol; 3-hydroxy-5-tertiary butyl phenol; 3-hydroxy-5-chloro phenol; 2-chloro-4-hydroxyphenol; 4-hydroxy-5-methylphenol; 2,3-dihydroxy-5-methyl phenol; 2,3-dihydroxy-5-bromophenol; 2,4-dihydroxy-5-tertiary butyl phenol; 2-methyl-3,5-dihydroxy phenol; 2-hydroxy-4-tertiary butyl phenol; 3-hydroxy-5-methyl phenol; 2,3-dihydroxy-5-tertiary butyl phenol; 2-hydroxy-4-ethyl phenol; 2-hydroxy-4-propyl phenol; 3-propyl-5-hydroxyphenol; 2-methyl-4-hydroxyphenol; 2-ethyl-5-hydroxyphenol; etc.

Specifically included are the hydroxyarylbenzoic acid esters, such as 2'-hydroxy-phenyl benzoate

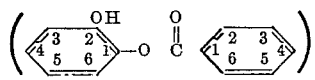

3'-hydroxy phenyl benzoate; 4'-hydroxy phenyl benzoate; 2',3'-dihydroxy phenyl benzoate; 3',4'-dihydroxy phenyl benzoate; 3',5'-dihydroxy phenyl benzoate; 2'-hydroxy-4'-methyl phenyl benzoate; 2'-hydroxy-5-tertiary butyl phenyl benzoate; 2'-hydroxy-4'-chlorophenyl benzoate; 3'-hydroxy-5'-methyl phenyl benzoate; 3'-hydroxy-5'-tertiary butyl phenyl benzoate; 3'-hydroxy-5'-chlorophenyl benzoate; 4'-hydroxy phenyl benzoate; 2'-hydroxy-4-tertiary butyl phenyl benzoate; 2'-hydroxy-4'-ethylphenyl benzoate; 3'-hydroxy-5-propyl-phenyl benzoate; etc., the hydroxy aryl-halo benzoic acid esters, such as 2'-hydroxy-phenyl-4-chloro-benzoate

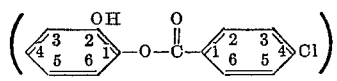

2'-hydroxy-4'-tertiary butyl phenyl-3-chlorobenzoate; 3'-hydroxy-5'-tertiary butyl-4-chlorobenzoate; 4'-hydroxy-4-chlorobenzoate; 2'-hydroxy-4-chlorobenzoate; 3'-hydroxy-5-chlorobenzoate; 2',3'-dihydroxy-4-bromobenzoate; 3',4'-dihydroxy-5-bromobenzoate; 2',4'-dihydroxy-4-chlorobenzoate; etc., the hydroxyaryl alkyl benzoic acid esters, such as 4'-hydroxy phenyl o-toluate

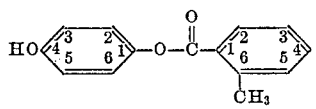

3'-hydroxy phenyl o-toluate; 2'-hydroxy phenyl-3,5-dimethyl benzoate; 2'-hydroxy-5'-tertiary butyl phenyl p-toluate; 2',3'-dihydroxy phenyl-4-tertiary butyl benzoate; 3'-hydroxy phenyl-5-ethyl benzoate; 2'-hydroxy-4'-chloro phenyl-4-tertiary butyl benzoate; 3'-hydroxy-5'-chlorophenyl-p-toluate; 3',5'-dihydroxy-4-tertiary butyl phenyl benzoate; etc.

The aforementioned compounds are preferably admixed with the oxymethylene polymers in amounts from about 0.01 percent to about 5 percent, based on the weight of the polymer and most preferably in amounts between about 0.25 percent and about 4 percent by weight.

In accordance with one aspect of this invention, the aforesaid light stabilizing compound is incorporated into an oxymethylene homopolymer, which may be end-capped as by esterification of a terminal hydroxyl group during or subsequent to polymerization. The homopolymers may be prepared by the polymerization of any suitable source of oxymethylene units, such as anhydrous formaldehyde or trioxane, a cyclic trimer of formaldehyde.

In accordance with a preferred embodiment of this invention, the aforesaid light stabilizing compound is incorporated into a copolymer having at least one chain containing oxymethylene (—CH$_2$O—) units (preferably at least 85 mol percent) interspersed with —O—R— units wherein R is a divalent radical containing at least two carbon atoms directly linked to each other and positioned in the chain between the two valences with any substituent in the R radical being inert. These copolymers may be prepared, for example, by copolymerizing trioxane with a cyclic ether having the structure

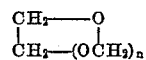

where $n$ is an integer from zero to two.

Among the specific cyclic ethers which may be used are ethylene oxide, 1,3-dioxolane, 1,3,5-trioxepane, 1,3-dioxane, trimethylene oxide, pentamethylene oxide, 1,2-propylene oxide, 1,2-butylene oxide, neopentyl formal, pentaerythritol diformal, paraldehyde, tetrahydrofuran, and butadiene monoxide.

The preferred catalysts used in the preparation of the desired copolymers are the boron fluoride coordinate complexes with organic compounds in which oxygen or sulphur is the donor atom.

The coordinate complex of boron fluoride may, for example, be a complex with a phenol, an ether, an ester, or a dialkyl sulfide. Boron fluoride dibutyl etherate, the coordinate complex of boron fluoride with dibutyl ether, is the preferred coordinate complex. The boron fluoride complex with diethyl ether is also very effective. Other boron fluoride complexes which may be used are the complexes with methyl acetate, with ethyl acetate, with phenyl acetate, with dimethyl ether, with methylphenyl ether and with dimethyl sulfide.

The coordinate complex of boron fluoride should be present in the polymerization zone in amounts such that its boron fluoride content is between about 0.001 and about 1.0 weight percent based on the weight of the monomers in the polymerization zone. Preferably, amounts between about 0.003 and about 0.1 weight percent should be used.

The monomers in the reaction zone are preferably anhydrous or substantially anhydrous. Small amounts of moisture, such as may be present in commercial grade reactants or may be introduced by contact with atmospheric air will not prevent polymerization, but should be essentially removed for best yields.

One method for preparing the oxymethylene polymers comprises dissolving the trioxane, cyclic ether (if any) and catalyst in a common anhydrous solvent, such as cyclohexane, and permitting reaction in a sealed reaction zone. The temperature in the reaction zone may vary from about 0° C. to about 100° C. The period of reaction may vary from about 5 minutes to about 72 hours. Pressures from subatmospheric to about 100 atmospheres may be used, although atmospheric pressure is preferred.

Upon completion of the polymerization reaction it is desirable to neutralize the activity of the polymerization catalyst since prolonged contact with the catalyst degrades the polymer. The polymerization product may be treated with an aliphatic amine, such as tri-n-butylamine, in stoichiometric excess over the amount of free catalyst in the reaction product, and preferably in an organic wash liquid which is a solvent for unreacted trioxane. Or, if desired, the reaction product may be washed with water which neutralizes catalyst activity.

A detailed description of the methods of neutralizing catalyst activity may be found in U.S. Patent 2,989,509 of Donald E. Hudgin and Frank M. Berardinelli.

In a preferred embodiment of this invention the polymer composition also contains a thermal stabilizer, such as a phenolic material.

Among the suitable phenolic materials are aliphatic and alicyclic phenols such as p-octyl phenol, p-phenyl phenol, p-cyclohexyl phenol, and alkylene bisphenols.

A suitable class of alkylene bisphenols includes compounds having from 1 to 4 carbon atoms in the alkylene group and having from zero to two alkyl substituents on each benzene ring, each alkyl substituent having from 1 to 4 carbon atoms. The preferred alkylene bisphenols are 2,2'-methylene bis-(5-methyl-6-tertiary butyl phenol); 2,2'-methylene bis-(4-methyl-6-tertiary butyl phenol); 2,2'-methylene bis(4-methyl-6-methyl cyclohexyl phenol); and 4,4'-butylidene bis-(6-tertiary butyl-3-methyl phenol).

Other stabilizers include amine compounds, such as diphenyl amine, and N,N,N',N'-tetrakis (2-hydroxypropyl)-1,2-ethylene diamine.

The thermal stabilizer, when used, is preferably admixed with the oxymethylene polymer in amounts from about 0.01 percent to about 2 percent based on the weight of polymer and most preferably in amounts between about 0.1 percent and about 1 percent by weight.

The aforementioned light stabilizers, and the thermal stabilizers, if desired, may be admixed intimately with the oxymethylene polymer by being applied in solution in a suitable solvent to the finely divided solid oxymethylene polymer followed by evaporation of the solvent. Diethyl ether, methanol, ethanol and acetone are typical suitable solvents.

The admixture may also be made by dry blending the finely divided oxymethylene polymer and finely divided stabilizers, by milling the stabilizers into the polymer as the latter is worked on a rubber mill or by dissolving the oxymethylene polymers and the stabilizers in a common solvent, such as dimethyl formamide.

The compositions of this invention may also include, if desired, plasticizers, fillers and other components which influence the final properties of the molded product.

Example I

To 150 g. of trioxane heated to 90° C., 0.05 g. BF$_3$. etherate was added with stirring, the mixture solidifying almost immediately and the temperature rising to 100° C. After removal from the vessel and pulverizing, the polymer was washed for ½ and 1 hour periods respectively, by refluxing with two portions of distilled water at 95–98° C. After drying 16 hours at 60° C., the resultant 80 g. of polyoxymethylene had an intrinsic viscosity of 1.3 in p-chlorophenol at 60° C.

A portion of the above described polymer was slurried in a diethyl ether solution of diphenylamine and resorcinal monobenzoate, containing enough diphenylamine to deposit 2 weight percent thereof on the polymer and enough resorcinol monobenzoate to deposit 4 weight percent on the polymer. The slurry was dried and the polymer was compression-molded at 180° C. and 1500 p.s.i. for 3 minutes to produce a disc having a diameter of 2.2 inches and a thickness of 20 mils. The disc was exposed in a X–1A Weatherometer (artificial weathering apparatus type D described in ASTM E–42–57) for an extended period and compared with respect to embrittlement and surface encrustation with other discs made up as described below.

Example II

Example I was repeated except that the resorcinol monobenzoate was omitted from the treating solution.

Example III

Example I was repeated except that the treating solution contained p-cyclohexyl phenol (enough to deposit 5 weight percent on the polymer) and resorcinol monobenzoate (enough for 2 weight percent on the polymer).

Example IV

Example I was repeated except that the treating solution contained N,N,N',N' tetrakis (2-hydroxypropyl)-1,2 ethylene diamine (enough to deposit 1 weight percent on the polymer), p-octyl phenol (1,1,3,3 tetramethylbutyl phenol, enough for 2 percent on the polymer) and resorcinol monobenzoate (enough for 4 percent on the polymer).

The results of accelerated weathering in the Weatherometer on the discs of the above examples was as follows:

| Example No. | Hours to Produce Embrittlement[1] | Surface Encrustation[2] |
|---|---|---|
| I | 400 | Moderate. |
| II | 100 | Heavy. |
| III | 400 | Light. |
| IV | 800 | Moderate. |

[1] Embrittlement was determined by observing the behaviour of the discs while cutting them with shears after exposure. Brittle discs developed transverse cracks while being cut and extremely brittle discs fall apart.
[2] Surface encrustation was evidenced by the formation of an opaque white, matte surface on the translucent discs.

Example V

One hundred parts of a finely divided copolymer having 95 weight percent of monomeric units derived from trioxane and 5 weight percent monomeric units derived from dioxolane was dry blended with one part of resorcinol monobenzoate. The blended powder was slurried in about 80 parts of methanol having dissolved therein 0.1 part of cyanoguanidine, 0.5 part of 2,2'-methylene bis(4-methyl-6 methyl cyclohexyl phenol). The slurry was dried in a vacuum oven and then milled in a sigma blade mixer for 15 minutes at 190°–194° C. A disc was compression molded from this polymer at 190° C. and 1600 p.s.i. for 3 minutes. When exposed in the Weatherometer as described above, there was no embrittlement after 800 hours.

By contrast, a disc prepared in an identical manner, except that the resorcinol monobenzoate was omitted, was brittle in less than 100 hours.

It is to be understood that the foregoing detailed description is given merely by way of illustration and that many variations may be made therein without departing from the spirit of my invention.

The embodiments of the invention in which an exclusive property or privilege is claimed are defined as follows:

1. An oxymethylene polymer composition comprising
   (1) a moldable oxymethylene polymer, and
   (2) at least one hydroxyphenyl ester of benzoic acid having the formula:

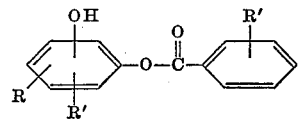

wherein:
   R is selected from the group consisting of hydrogen and hydroxy radicals, and
   R' is selected from the group consisting of hydrogen, halogen, and alkyls having from 1 to 4 carbon atoms,
   said ester being present in sufficient amount so that said polymer composition exhibits a greater degree of light stability than does said polymer composition in the absence of said light stabilizing compound.

2. The composition of claim 1, wherein the hydroxyphenyl ester of benzoic acid is present in the amount of from about 0.01 to about 5.0%, based on the weight of the polymer.

3. The composition of claim 2, wherein said oxymethylene polymer is a copolymer having at least one chain containing at least 85 mol percent recurring oxymethylene units interspersed with —O—R— units, wherein R is a divalent radical containing at least two carbon atoms directly linked to each other and positioned in the chain between the two valences with any substituent in the R radical being inert.

4. An oxymethylene polymer composition comprising
   (1) a moldable oxymethylene polymer, and
   (2) from about 0.01 to about 5.0%, based on the weight of the polymer, of an hydroxyphenyl ester of benzoic acid having the formula:

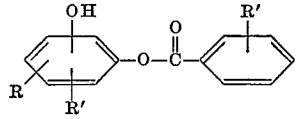

wherein:
   R is selected from the group consisting of hydrogen and hydroxy radicals, and
   R' is selected from the group consisting of hydrogen, chlorine, bromine, and alkyls having from 1 to 4 carbon atoms.

5. The composition of claim 4, wherein said oxymethylene polymer is a copolymer having at least one chain containing at least 85 mol percent recurring oxymethylene units interspersed with —O—R— units, wherein R is a divalent radical containing at least two carbon atoms directly linked to each other and positioned in the chain between the two valences with any substituent in the R radical being inert.

6. The composition of claim 5, wherein the hydroxyphenyl ester of benzoic acid is present in the amount of from about 0.25 to about 4.0%, based on the weight of the polymer.

7. An oxymethylene polymer composition comprising
(1) a moldable oxymethylene polymer,
(2) from about 0.01 to about 5.0%, based on the weight of the polymer, of an hydroxyphenyl ester of benzoic acid having the formula:

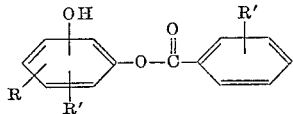

wherein:
R is selected from the group consisting of hydrogen and hydroxy radicals, and
R' is selected from the group consisting of hydrogen, chlorine, bromine, and alkyls having from 1 to 4 carbon atoms, and
(3) an alkylene bisphenol having from 1 to 4 carbon atoms in the alkylene group and from zero to two alkyl substituents on each benzene ring, each alkyl substituent having from 1 to 4 carbon atoms, said alkylene bisphenol being present in sufficient amount so that said polymer composition exhibits a greater degree of thermal stability than does said polymer composition in the absence of said alkylene bisphenol.

8. The composition of claim 7, wherein said oxymethylene polymer is a copolymer having at least one chain containing at least 85 mol percent recurring oxymethylene units interspersed with —O—R— units, wherein R is a divalent radical containing at least two carbon atoms directly linked to each other and positioned in the chain between the two valences with any substitutent in the R radical being inert, said alkylene bisphenol is present in an amount in the range of from about 0.01 to about 2.0%, based on the weight of the polymer.

9. The composition of claim 8, wherein the hydroxyphenyl ester of benzoic acid is 3'-hydroxyphenylbenzoate.

10. The composition of claim 8, wherein the hydroxyphenyl ester of benzoic acid is present in an amount of from about 0.25 to about 4.0%, based on the weight of the polymer.

No references cited.

DONALD E. CZAJA, *Primary Examiner.*

V. P. HOKE, *Assistant Examiner.*